United States Patent [19]

Osawa

[11] Patent Number: 4,944,608
[45] Date of Patent: Jul. 31, 1990

[54] ROLLER-TYPE LINEAR GUIDE

[75] Inventor: Nobuyki Osawa, Takasaki, Japan

[73] Assignee: Nippon Seiko Kabushiki Kaisha, Tokyo, Japan

[21] Appl. No.: 357,116

[22] Filed: May 26, 1989

Related U.S. Application Data

[63] Continuation-in-part of Ser. No. 174,235, Mar. 28, 1988, abandoned.

[51] Int. Cl.$^5$ .......................... F16C 29/04; F16C 29/12
[52] U.S. Cl. ......................................... 384/58; 384/53; 384/57
[58] Field of Search .................... 384/7, 10, 40, 50, 53, 384/54, 57, 58, 255, 449; 74/569

[56] References Cited

U.S. PATENT DOCUMENTS

| | | | |
|---|---|---|---|
| 1,811,508 | 6/1931 | Klages | 384/53 |
| 2,622,939 | 12/1952 | Ljunggren | 384/53 |
| 2,997,346 | 8/1961 | Beninger et al. | 384/58 X |
| 4,715,730 | 12/1987 | Magnuson | 384/58 X |

FOREIGN PATENT DOCUMENTS

| | | | |
|---|---|---|---|
| 3013410 | 10/1981 | Fed. Rep. of Germany | 384/53 |
| 3132869 | 3/1983 | Fed. Rep. of Germany | 384/57 |
| 917367 | 3/1982 | U.S.S.R. | 384/50 |

Primary Examiner—Thomas R. Hannon
Attorney, Agent, or Firm—Weintraub, DuRoss & Brady

[57] ABSTRACT

A roller-type linear guide includes a slider having side walls and mounted on a guide rail. The slider is provided with a pair of upper slider support members and a pair of lower slider support members, respectively, protruding obliquely from the inner surfaces of side walls thereof towards V-shaped track grooves formed in opposite sides of the guide rail. Each of the upper and lower slider support members includes a roller supported rotatably on the tip of a support shaft, and an eccentric bushing is fitted around the support shaft integrally therewith. The support shaft with the eccentric bushing fitted thereon is inserted into a fixing through hole which penetrates the side wall, obliquely, so that the roller is eccentrically supported with respect to the axial line of the fixing hole. The roller abuts against the surface of the V-shaped track groove of the guide rail with a preload to absorb looseness between the slider and the guide rail. The inside space for receiving rollers of supporting members is substantially trapezoidal in cross section, and the fixing holes for fixing the support shafts of the lower slider supporting members extend to and open at an end face of the slider.

3 Claims, 3 Drawing Sheets

ROLLER-TYPE LINEAR GUIDE

CROSS-REFERENCE TO RELATED APPLICATIONS

The present application is a continuation-in-part of U.S. patent application No. 07/174,235 filed Mar. 28, 1988, now abandoned, the disclosure of which is hereby incorporated by reference.

BACKGROUND OF THE INVENTION

1. Field of the Invention

The present invention relates to an improved roller-type linear guide.

2. Description of the Prior Art

A prior art roller-type linear guide is, for example, disclosed in Japanese Utility Model Laid-Open Publication NO. 57-42216. In this prior art linear guide, as shown in FIGS. 1 and 2, a truck 2 is straddlingly mounted on a track 1 having V-shaped grooves 1A and 1B formed in opposite sides thereof. The truck 2 has a plurality of rotating members 4 attached to opposite side walls 2A and 2B. The rotating members 4 include rollers 3 which roll in the V-shaped grooves 1A and 1B of the track 1. Furthermore, the setting angle of at least one pair of rotating shafts 5 of the rotating members 4 is 135°, and the setting angle of other rotating shafts is 45°. As a result, when the truck 2 travels on the track 1, the rollers 3 of the rotating members 4 having the rotating shafts 5 whose setting angle is 135° are in close contact with the upper surfaces of the V-shaped grooves 1A and 1B, and the rollers 3 of the rotating members 4 having the rotating shafts 5 whose setting angle is 45° are in close contact with the lower surfaces of the V-shaped grooves 1A and 1B.

In the roller-type linear guide having the structure as mentioned above, there is a possibility of causing a looseness between the truck 2 and the track 1 supporting the former due to errors during manufacturing, such as a deviation in the inclination angle of the roller rotating shaft 5 and a center deflection of the roller 3, or attaching error of the rotating member 4, or non-uniform wear of the roller 3 caused by unbalanced load of a mounted member on the truck 2.

Furthermore, the prior art roller-type linear guide involves a problem in that no preload adjusting means effective in preventing the looseness has been taken into consideration.

Moreover, the prior art roller-type linear guide involves a problem in that the height of the truck should by all means be large so as to make the roller-type linear guide be disadvantageous for a compact design because where the height of the truck would be small it is difficult to ensure necessary width of inside space for inserting the rotating shaft of the rollers to be contacted to the lower surfaces of the V-shaped grooves 1A and 1B.

SUMMARY OF THE INVENTION

It is an object of the present invention to provide a roller-type linear guide including a preload adjusting means.

It is also an object of the present invention to provide a compact roller-type linear guide.

In order to solve the above-mentioned problem, a roller-type linear guide in accordance with the present invention comprises a guide rail extending in the axial direction and having a V-shaped track grooves formed in both sides thereof, and a slider movably straddlingly mounted on the guide rail. The slider has opposed side walls provided with at least a pair of upper slider supporting members whose rollers roll in contact with upper surfaces of the V-shaped track grooves of the guide rail, and at least a pair of lower slider supporting members whose rollers roll in contact with lower surfaces of the V-shaped track groove of the guide rail. Furthermore, at least two have the rollers supported eccentrically.

Part of each roller is received in a cross sectionally trapezoidal accommodation space formed between the rail and the slider, the trapezoidal accommodation space mating to the respective V-shaped track groove so as to form a substantially rectangular space which receives therein the whole of each roller.

The upper slider supporting members and lower supporting members are held in corresponding fixing holes which are formed through the slider between inside and outside side walls thereof.

The fixing holes for holding the lower slider supporting members extend to each end face of the side walls of the slider and open axially on each end face of the slider.

Therefore the lower slider supporting members can be inserted into the fixing holes from the end faces of the side walls of the slider without requiring wide accommodation spaces for the lower slider supporting members.

By changing the supporting position of the roller, which is supported eccentrically, the rolling surface of the roller is pressed against the surface of the V-shaped track groove with a varying load depending on the amount of change in position and the degree of eccentricity. Thus, the roller is suitably preloaded, and the slider is supported by the guide rail without looseness.

By virtue of the trapezoidal accommodation spaces for the rollers and the fixing holes extending to the end faces of the side wall of the slider for the lower slider supporting members, the slider can be designed so as to be compact in its height.

DESCRIPTION OF THE PREFERRED EMBODIMENT

Figure 1:
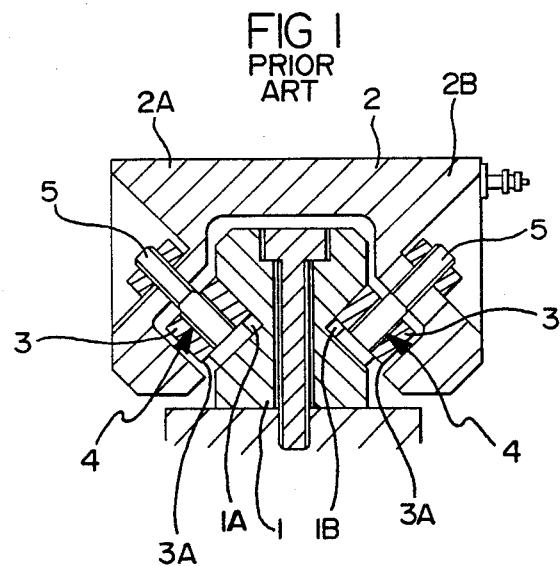
FIG. 1 is a sectional view of a prior art roller-type linear guide.
Figure 2:
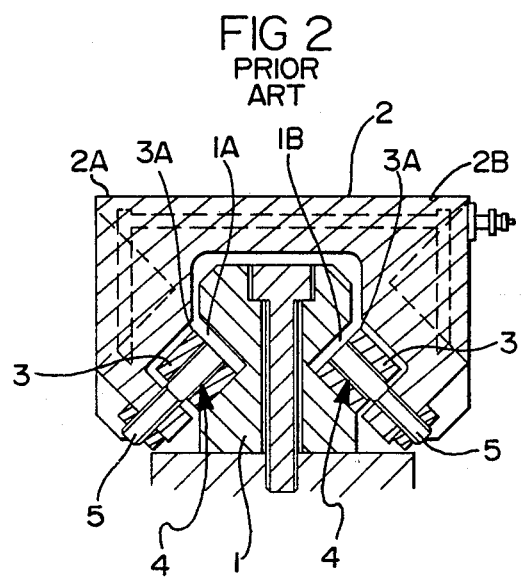
FIG. 2 is a sectional view at a different position of the prior art roller-type linear guide of FIG. 1.

FIGS. 3 to 6 show an embodiment of the present invention. A roller-type linear guide includes a guide rail 11 extending in an axial (longitudinal) direction, and a slider 12 having an inverted U-shaped cross-section and which is movably straddlingly mounted on the guide rail 11 with a small gap therebetween.

The guide rail 11 has V-shaped track grooves 13 formed symmetrically in the outer surfaces of both right ane left sides thereof. In this embodiment, an upper surface 13A and a lower surface 13B of the track groove 13 intersect at right angles. These upper and lower surfaces 13a and 13B are each formed in a planar shape. However, these surfaces may be formed somewhat in a concave plane to match a convex shape of the rolling surface r of the roller R as will be described later.

It is preferable to form the V-shaped track grooves 13 as closely as possible to an upper surface 11A of the guide rail 11. The structure of the present invention contributes to reducing the height of the guide rail 11 so as to form the overall roller-type linear guide more compactly than was possible in the prior art.

The guide rail 11 is secured to a mounting bed (not shown) by means of a bolt or other suitable fastener which is inserted in a fixing hole 14 in the rail 11.

The side walls 12a and 12b of the slider 12 are provided at the inside thereof with a pair of upper slider support members 15 and a pair of lower slider support members 16. The upper and lower slider support members 15 and 16 engage the right and left V-shaped track grooves 13 for movably supporting the slider 12. Each of the slider support members 15 and 16 has a roller R, made of steel, at the tip of a support shaft S such that the roller R is rollable by a needle bearing (not shown). In order to make the rolling surface r of the roller abut against the slant surface of the V-shaped track groove 13, each of the slider support members 15 and 16 is attached to a corresponding one of the side walls 12a and 12b so that the support shaft S is slanted with respect to the guide rail 11. The slider support members 15 and 16 are secured by nuts N which are threaded to male threads at the ends of the support shafts S. In one embodiment of the present invention, the rolling surface r of the roller R is formed in a drum-shaped convex shape.

Each of the upper slider support members 15 has its support shaft S inserted through a fixing hole 17 formed to penetrate either the side wall 12a or 12b. The fixing holes pass through an upper portion of the outer surface of the slider 12 at a slant angle of 45°, and the roller R is accommodated in an accommodation space 18 formed by cutting the inner surface of either the side wall 12a or 12b.

Figure 3:
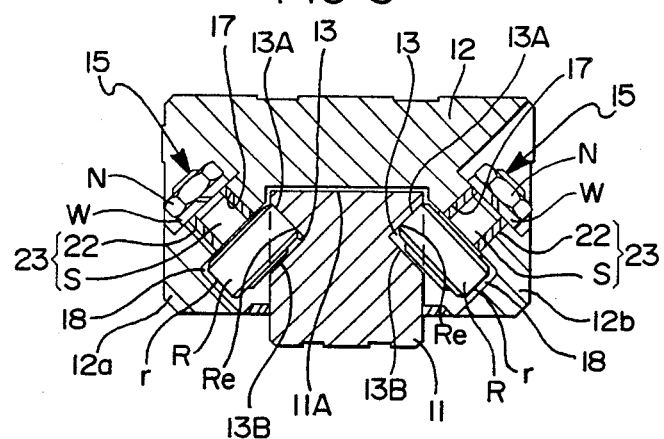
FIG. 3 is a transverse sectional view showing an embodiment of a roller-type linear guide in accordance with the present invention taken along the line III—III in FIG. 4.

As shown in FIG. 3, the accommodation space 18 is formed in a cross-sectionally trapezoidal groove, and this makes a substantially rectangular space with the mating track groove 13 of the guide rail 11, the substantially rectangular space receiving therein the whole of the roller R.

In the depicted embodiment, the rolling surface r abuts against the upper surface 13A of the V-shaped track groove 13 of the guide rail 11. The upper slider support members 15 are attached to the slider 12 before the slider 12 is assembled to the guide rail 11.

Figure 4:
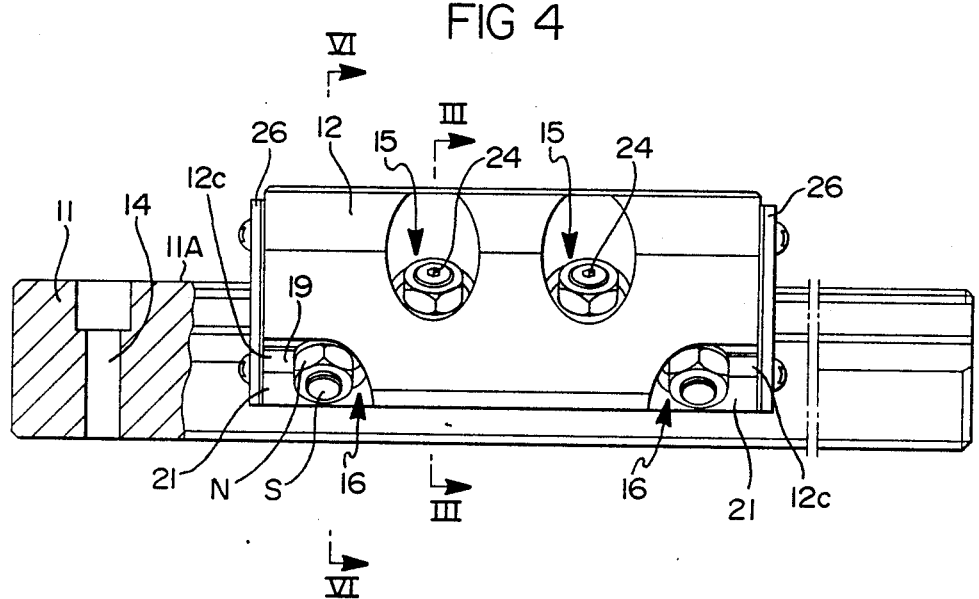
FIG. 4 is a side plan view of the roller-type linear guide of FIG. 3.
Figure 5:
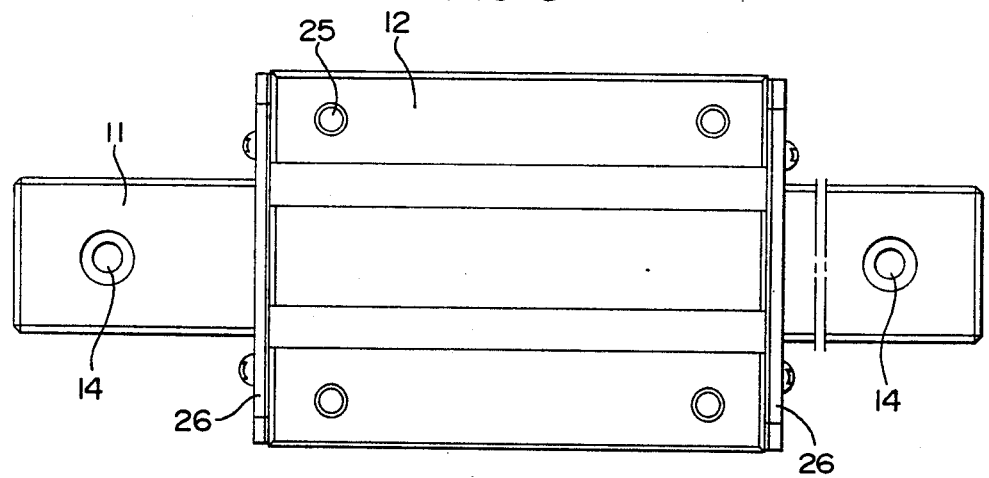
FIG. 5 is a top plan view of the roller-type linear guide of FIG. 4.

On the other hand, as shown in FIG. 4, each of the lower slider support members 16 has a support shaft S inserted into a fixing hole 19 which penetrates a corresponding one of the side walls 12a or 12b from the lower corner of the outer surface of the slider 12 at a slant angle of 45° to reach an opening at the inner surface of the side wall 12a or 12b.

The fixing holes 19 for holding and fixing therein the support shafts of the lower support members 16 extend to the corresponding near end faces of side walls 12a and 12b and open on that end face so as to form a guide slot for the support shaft of the lower supporting member 16. Thus, the lower slider support members 16 may be installed after the slide 12 is assembled to the guide rail 11.

Figure 6:
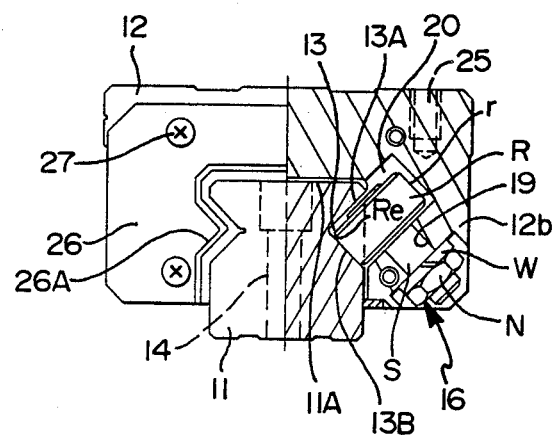
FIG. 6 is a front view with a partial sectional view taken along the line VI—VI in FIG. 4.

Especially as shown in FIG. 6 the accommodation space 20 is formed in a trapezoidal groove, and makes a substantially rectangular space with the mating track groove 13 of the guide rail 11. The substantially rectangular space receives the roller therein, and one end thereof is open at the corresponding end face 12a of the side wall of the slider 12. By virtue of the fixing hole 19 being opened at the end face 12 of the side wall 12a, 12b, the lower slider support member 16 can be inserted from the end face 12c of the side wall 12a, 12b. Enough space is provided at the end face 12c to receive the length of the support shaft of the lower slider supporting member 16, and because of this, slider 12 can be designed so as to be compact in its height. In attaching a lower slider support member 16, the roller R is pushed from the end face 12c of the slider 12 in the axial direction of the slider 12 while the support shaft S is placed in the fixing hole 19 and the roller R is put in the accommodation space 20. Then, the slider support member 16 is fixed to the slider 12 by means of a washer W and a nut N similar to the arrangement in the upper slider support member 15.

In order for the rotation center of the roller R of each of the upper slide support members 15 to be eccentrically adjustable with respect to the center of the fixing hole 17 of the slider 12, an eccentric bushing 22 is tightly fitted around the support shaft S of the upper slider member 15 beforehand to form an eccentric support shaft 23. Thereafter, the eccentric support shaft 23 is fixed in the fixing hole 17. A hexagonal hole 24, for a wrench, is formed at the top of the eccentric support shaft 23 to allow rotation of the eccentric shaft at the time of adjusting the preload.

The upper surface of the slider 12 is formed with a plurality of internally threaded screw holes 25 for accommodating a member (not shown) to be mounted thereon. In addition, dust-proof seals 26 made of rubber, plastic, or the like are attached to the front and rear ends 12c of the slider 12, and V-shaped lip portions 26A are slidably in contact with the V-shaped track grooves 13 of the guide rail 11.

In the roller-type linear guide structured as mentioned above, when the slider 12 is assembled to the guide rail 11, a preload is applied to the upper surface 13A of the V-shaped track groove 13 by the upper slider supporting member 15 through the eccentric support shaft 23. Accordingly, even when an error is present in assembling each of the slider supporting members 15 and 16, the error can be compensated for by adjusting the preload.

Furthermore, when the rolling surface r of the roller R is worn non-uniformly from the travelling of the slider 12, a looseness is caused between the slider 12 and the guide rail 11 supporting the former, and it becomes impossible to absorb the looseness by the preload which was applied at the time of assembling. In this case, a wrench is inserted in the hexagonal hole 24 for preload adjustment while the nut N of the upper slider support member 15 is loosened a little, and the eccentric support shaft 23 is rotated. As a result, the axial line of the roller R is displaced towards the upper surface 13A of the V-shaped track groove 13 thereby to adjust the amount of preload.

In the prior art roller-type linear guide, due to the deviation of a mounted member mounted on the slider 2, or assembling error or the like, an edge load is caused, in which an excessive load is concentrated at the edge portion 3A of the roller 3, resulting in damage to the roller 3 or the track 1 and a reduction of the useful life of the unit. However, in the present invention since the rolling surface r of the roller R is a convex surface, no edge load is caused at the roller edge Re.

Furthermore, since looseness of the slider 12 is prevented by adjustment of the eccentric support shaft 23, which is a preload adjusting means, it is possible to receive the load from all directions including vertical and transverse directions, and the load capacity and the life of the assembly can be remarkably improved as compared with the prior art.

Moreover, inexpensive cam followers available on the market can be utilized as the upper and lower slider support members 15 and 16. Accordingly, it is possible to provide an optimum roller-type linear guide at a low cost in accordance with the various use applications discussed herein with different loads and speeds.

In the above embodiment, as the preload adjusting means, there is shown the eccentric support shaft which is formed by fitting the eccentric bushing 22 to the support shaft S of the upper slider supporting member 15. However, the eccentric bushing 22 may be fitted to the support shaft S at a position inside the roller R so that the roller R is supported rotatably by the eccentric bushing 22. Alternatively, the the support shaft S itself of the upper slider support member may be formed eccentrically.

In addition, the roller R and the support shaft may be formed integrally, and the support shaft S may be rotatably supported rotatably by the bushing 22.

Furthermore, the preload adjusting means is not necessarily exclusively provided on the upper slider supporting member 15. It is possible to provide the preload adjusting means on the lower support member 16. Further, the preload adjusting means may be provided on the upper and lower slider support members 15 and 16 of either one of the slide walls 12a and 12b.

A roller having a rubber or a plastic layer molded on the outer surface thereof may be used, and in this case, the advantage is that noise during operation of the slider can be reduced or prevented.

In the present invention, as the preload adjusting means, the roller of the roller-type linear guide is made to be eccentric with respect to the fixing hole formed in the slider. As a result, an advantage is provided in that it is possible to prevent looseness from being caused due to a manufacturing error or an assembling error, or non-uniform wear of the roller due to unbalanced load of the mounted member on the slider. By virtue of this fact, it is possible to provide a roller-type linear guide which has a long life and a large load capacity at low costs, and which also has a stable operation property as a guide bearing of a linear movement component of a general roller type linear guide which can be designed so as to be compact in its height.

Having, thus, described the invention, what is claimed is:

1. A roller-type linear guide comprising:
   a guide rail having opposed sides with outer surfaces thereon, the rail extending in a longitudinal direction and having V-shaped track grooves respectively formed in the outer surfaces of opposite sides thereof;
   a slider having two side walls each of the side walls having a cross-sectionally trapezoidal accommodation space formed in the inside thereof, the slider being movably straddlingly mounted on said guide rail across the width of said guide rail,
   a pair of upper slider support members, respectively, attached to the side walls of the slider and, respectively, having rollers rollable on the upper surfaces of the V-shaped track grooves at opposite sides of the guide rail;
   a pair of lower slider support members, respectively, attached to said side walls of said slider and, respectively, having rollers rollable on lower surfaces of said V-shaped track grooves at opposite sides of said guide rail; and
   wherein part of at least one of the rollers is received in a cross-sectionally trapezoidal accommodation space in the slider, the trapezoidal accommodation space mating to the respective V-shaped track groove so as to form a substantially rectangular space which receives therein the whole of the roller.

2. The roller-type linear guide of claim 1 wherein an exterior portion of each of the side walls is cut away to facilitate installation of the lower slider support members in the slider.

3. A roller-type linear guide comprising:
   a guide rail having opposed sides with outer surfaces thereon, the rail extending in a longitudinal direction and having V-shaped track grooves respectively formed in the outer surfaces of opposite sides thereof;
   a slider having two side walls and an end face between the side walls at an end thereof, and being movably straddlingly mounted on said guide rail across the width of said guide rail,
   a pair of upper slider support members, respectively, attached to the side walls of the slider and, respectively, having rollers rollable on upper surfaces of the V-shaped track grooves at opposite sides of the guide rail;
   a pair of lower slider support members, respectively, attached to the side walls of the slider and, respectively, having rollers rollable on lower surfaces of said V-shaped track grooves at opposite sides of said guide rail;
   the slider having fixing holes formed therethrough between the inside and the outside of each of the side walls for fixing the upper and lower slider support members therein, and wherein the fixing holes for fixing the lower slider support members extend to and open at the end face of the slider to allow the lower slider support members to be inserted therein.

* * * * *